Figure 1:
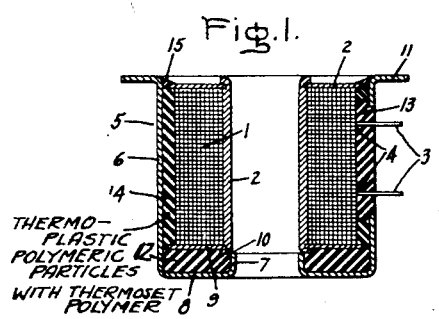

March 15, 1949.  E. J. FLYNN ET AL  2,464,568
ELECTRICAL COIL INSULATED WITH THERMOPLASTIC
PARTICLES AND THERMOSET POLYMER
Filed May 14, 1945

THERMO-
PLASTIC
POLYMERIC
PARTICLES
WITH THERMOSET
POLYMER

Inventors:
Edward J. Flynn,
Frank J. Lasak,
by Harry E. Dunham
Their Attorney.

Patented Mar. 15, 1949

2,464,568

UNITED STATES PATENT OFFICE 2,464,568

ELECTRICAL COIL INSULATED WITH THERMOPLASTIC PARTICLES AND THERMOSET POLYMER

Edward J. Flynn and Frank J. Lasak, Schenectady, N. Y., assignors to General Electric Company, a corporation of New York Application May 14, 1945, Serial No. 593,628

7 Claims. (Cl. 175—21)

This invention relates to articles of manufacture comprising an electrical coil, more particularly an electrical coil insulated with solid insulation comprising thermoset solventless varnish, e. g., a solventless varnish comprising diethylene glycol maleate and diallyl phthalate in thermoset or substantially insoluble and infusible state, combined with thermoplastic polymeric material, e. g., polymerized methyl methacrylate, polyvinyl acetal resins, specifically polyvinyl formal resins, etc. Still more particularly the invention is concerned with electrical devices including an electrical coil comprising windings of an insulated electrical conductor, e. g., an enameled or otherwise insulated copper wire, which windings are at least partly covered with solid insulation comprising thermoplastic polymeric material intimately associated with thermoset solventless varnish. The thermoplastic polymeric material advantageously is either in the form of finely divided particles when contacted with the solventless varnish in liquid state, or in the form of a permeable mass, specifically a permeable mass of partly cohering, e. g., partly fused, particles or granules. The scope of the invention also includes method features for the treatment of an electrical coil or coil assembly.

Considerable advance has recently been made in the treatment of various electrical devices, e. g., coils including, for instance, magnet coils, relay coils, magneto coils, etc., for the purpose of protectively covering and insulating them, by treating the coil with a polymerizable, thermosetting (heat-hardenable) solventless varnish, that is, a liquid composition in which the entire varnish mass, including such thinner of the thermosetting resin component as may be present, polymerizes or cures to a substantially insoluble and infusible or thermoset state, and thereafter treating the coil, as by heating, to convert the liquid varnish to solid state. The use of solventless varnishes for treating electrical coils and the like provides an improved dry-type coil as compared with those obtained when the impregnating medium is a liquid resin or solvent-containing varnish that evolves liquid or gas on curing. In treating some types of coils, however, considerable skill and manipulation, usually involving a slow, carefully controlled curing operation, are required to avoid cracking of the cured solventless varnish and to prevent voids in the treated coil. These difficulties are enhanced when the design of the coil and the purpose for which it is to be used, e. g., as a part of airborne electrical apparatus, require that the coil structure have maximum mechanical strength, freedom from voids and resistance to moisture and other agents, together with rapid dissipation of heat from the coil during service use and maximum resistance to breakdown of the insulation under electrical stress.

The present invention resulted from our discovery that the above difficulties are obviated and electrical coils meeting the aforementioned requisites are produced by filling the unfilled spaces of the electrical coil or coil assembly with (1) thermoplastic polymeric material, more particularly thermoplastic polymeric resin, and (2) polymerizable, thermosetting, solventless varnish, and polymerizing or curing the varnish to solid state, specifically to a substantially insoluble and infusible state. The method is relatively inexpensive and provides coils having substantially uniform characteristics from batch to batch, so that there are relatively few coils that fail to pass inspection tests. Furthermore, the coils are dependable in service over a wide range of temperature, humidity and altitude conditions, and have a relatively long service life.

Figure 2:
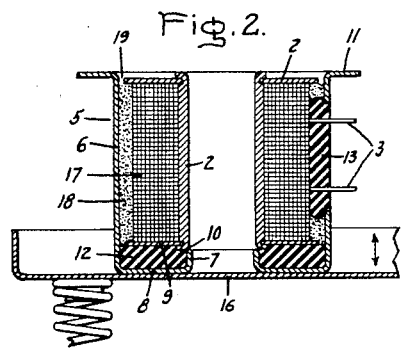
Figure 3:
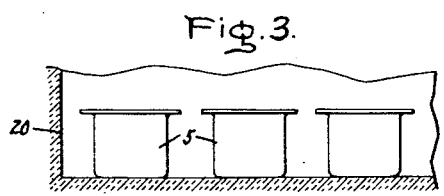
Figure 4:
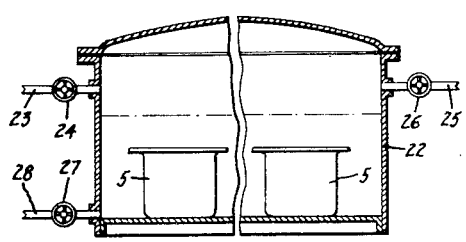
Figure 6:
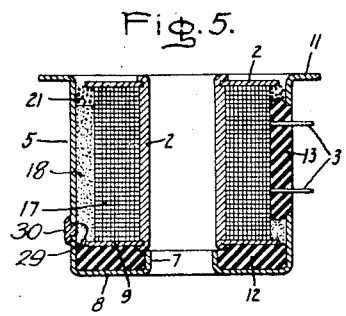
Figure 5:
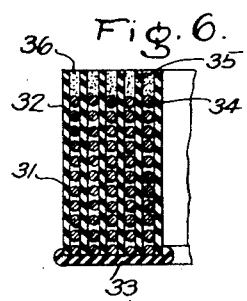

The novel features of the invention are set forth in the appended claims. The invention itself, however, will best be understood from the following detailed description when considered in connection with the accompanying drawing illustrating embodiments of the invention and in which Fig. 1 is a diagrammatic sectional view of a completed coil illustrative of one embodiment of the invention; Figs. 2, 3 and 4 illustrate diagrammatically steps in the production of the coil shown in Fig. 1; Fig. 5 is a diagrammatic sectional view of a partly completed coil illustrative of a modification of the technique that may be employed in producing the coils of this invention; and Fig. 6 is a diagrammatic sectional view of a portion of a coil illustrative of another modification of the invention.

In practicing the invention a suitable conductor, for example a copper wire, is first provided in any suitable manner with a covering of suitable insulation, e. g., enamel, paper, etc. The conductor insulation advantageously may be a polyvinyl acetal resin, specifically a polyvinyl formal resin, or such a resin suitably modified with a phenol-aldehyde resin, specifically a cresol-formaldehyde resin. The insulated conductor is wound on a suitable temporary or permanent core such, for instance, as a shellac-coated kraft paper tube, a molded phenol-aldehyde resin tube, a bobbin or spool body of metal or other material. Depending upon the type of coil the layers of helices of insulated conductor may or may not be separated in whole or in part with suitable layer insulation, for example a thin sheet of paper. Low-voltage coils generally are random or layer wound wires without layer insulation, while high-voltage types frequently have paper or other insulation between layers or parts of each layer.

The treatment of the electrical coil or coil assembly is carried out, in accordance with the preferred method of the invention, by first providing the unfilled spaces of the coil or coil assembly in any suitable manner with a permeable mass of thermoplastic polymeric material. This may be done, for instance, by providing the coil with a temporary or permanent casing or housing formed of metal or other material which is substantially impervious to the solventless varnish. This casing is so designed as to leave a space between the walls thereof and the windings of the coil. After sealing openings where leakage of subsequently applied varnish otherwise might occur but leaving an opening for the introduction of insulation material, the aforementioned permeable mass is formed in the space between the walls of the casing and the coil windings, for example, by filling the space, preferably while vibrating the coil, with thermoplastic polymeric material in granular, pellet, flake, powdered or other finely divided state, and suitably treating (e. g., heating) this material in place, that is, in situ, to cause partial cohesion of the particles. Partial cohesion of the particles, at least in the region adjacent that at which the impregnating varnish enters the coil structure, and the formation of a relatively rigid or non-flowing permeable mass at this point are desirable in order to prevent the subsequently applied varnish from washing out particles of polymeric material from the coil.

Instead of causing partial cohesion of the particles by heating at least those particles lying in the region near the point where the varnish enters the coil, we may only partly fill the space between the walls of the casing and the coil windings with finely divided, thermoplastic, polymeric material and then fill the remaining space with a plastic or putty-like permeable mass, for example a mixture of (1) finely divided, polymerized methyl methacrylate, methyl acrylate, styrene or other comminuted, thermoplastic, polymeric material and (2) a hardenable binder therefor, for instance, a polymerizable, thermosetting solventless varnish, e. g., a mixture of diethylene glycol maleate and diallyl phthalate.

The coil is now treated, preferably after evacuating air and other undesirable volatile matter from the entire coil assembly, to impregnate the mass of thermoplastic polymeric material with polymerizable, thermosetting solventless varnish. Such a varnish advantageously may comprise (1) a polymerizable unsaturated alkyd resin, more particularly one obtained by partial reaction of ingredients including a polyhydric alcohol and an alpha-unsaturated alpha, beta-polycarboxylic acid, e. g., ethylene glycol fumerate, ethylene glycol maleate, diethylene glycol itaconate, triethylene glycol maleate, propylene glycol itaconate, glyceryl itaconate, ethylene glycol maleate phthalate, diethylene glycol fumerate sebacate, etc., and (2) a liquid monomer containing an ethylenic linkage that is copolymerizable with such alkyd resin, e. g., styrene, polyallyl (diallyl, triallyl, tetraallyl, etc.) esters of polybasic acids (e. g., inorganic polybasic acids, polycarboxylic acids, etc.), for instance, diallyl oxalate, diallyl malonate, diallyl sebacate, diallyl maleate, diallyl phthalate, diallyl itaconate, triallyl aconitate, triallyl tricarboxylate, triallyl phosphate, etc. The solventless varnish also preferably contains a small amount, for instance, about 0.2 to 5 per cent by weight (of the polymerizable components), of a suitable catalyst, e. g., lauroyl peroxide, stearyl peroxide, ascariodole, benzoyl peroxide, acetyl peroxide, etc., for accelerating the conversion of the polymerizable component or components thereof to a thermoset or substantially insoluble and infusible state.

A preferred method of treatment comprises placing the coil or coil assembly in a vacuum chamber where air and other undesirable volatile matter are evacuated from the coil, for instance by holding the chamber under suitably low pressure, e. g., a pressure of 50 to 2,000 microns, for a suitable period, e. g., from ½ to 6 hours. The solventless varnish is admitted to the chamber in an amount at least sufficient to cover the coil. The bath of varnish in the chamber is maintained under substantial pressure, e. g., from 50 to 150 pounds per square inch or more, preferably under an atmosphere of a non-explosive gas to which the varnish is inert, e. g., nitrogen, argon, helium, krypton, neon, etc., for a suitable period, e. g., from ½ to 4 hours or more. In this way substantially all voids in the coil structure are filled with solventless varnish. The coil is removed from the bath of varnish, freed of excess varnish appearing on the exterior surfaces, e. g., by wiping the coil, allowing the varnish to drain off, or a combination of both such means. The coil is then treated, for example by placing it in a heated oven, to polymerize the polymerizable, thermosetting, solventless varnish to solid state.

The finely divided, thermoplastic polymeric material lessens the amount of heat produced during polymerization of the solventless varnish, obviates cracking of the solid insulation due to excessive shrinkage, permits shorter periods than otherwise are necessary for effectively curing or baking the impregnated coil, and provides in the finished coil a mass of solid insulation which is hard, tough, of high dielectric strength, highly resistant to shock and to temperature and humidity changes, and which is substantially free from voids. Furthermore, this composite insulation holds the coil rigidly in place and rapidly dissipates heat therefrom during service use.

The above-described technique for filling the voids of a coil structure with a combination of finely divided, thermoplastic polymeric material and solventless varnish is especially applicable for use in treating small coils which are not readily or effectively impregnated with a solventless varnish containing a finely divided filler due to the high viscosity of such a mass when it contains sufficient filler to obviate the excessive shrinking and resultant cracking that may occur during the curing of such varnish in the absence of a filler.

With further reference to the drawing there is shown by way of illustration in Fig. 1 a diagrammatic sectional view of a voltage regulator relay coil embodying the invention wherein insulated conductor 1, specifically a copper wire insulated with a phenol-aldehyde-modified polyvinyl formal resin, is wound in layers on a metallic core or spool 2. The leads or terminals 3 are suitably joined to the conductor 1 at 4, the insulation first having been scraped from the ends of the conductor before attaching it, e. g., by soldering, to the leads 3. The coil fits within a metallic casing or housing 5 comprising outer side wall 6, inner side wall 7 and bottom wall 8. The inner side wall 7 meets the bottom member 9 of the spool 2 at 10. The inner side wall may be threaded if desired to aid in fastening the coil in the apparatus where it is to be used. The outer wall 6 terminates in flange 11 which may be employed in attaching the coil in the electrical device of which it is a part.

The insulation 12 between the bottom member 9 of the spool 2 and the bottom wall 8 of the casing 5 is a hardened sealing compound or putty. For example, it may be produced by hardening, as by heating, a thermosetting mixture of finely divided inorganic filler, e. g., talc, sand or other form of silica, mica, asbestos, etc., and a heat-hardenable binder, e. g., a polymerizable, thermosetting, solventless varnish. The insulation 12 is in plastic form when placed in the bottom of the casing 5, and is hardened in situ after the wound coil has been fitted into place.

The insulation 13 rigidly holds the leads 3 in position and seals the opening provided in the outer side wall 6 for their passage. Insulation 13 may comprise the same material as insulation 12.

The insulation 14 comprises thermoplastic polymeric material, specifically polymerized methyl methacrylate, combined with thermoset solventless varnish, more particularly a copolymer of diethylene glycol maleate and diallyl phthalate in proportions, by weight, ranging, for example, from 20 to 80 per cent of the former to 80 to 20 per cent of the latter, and specifically about equal parts by weight. The polymeric material initially is in particle form when contacted with the solventless varnish in liquid state.

The insulation 15 may comprise the same material as insulation 12 and 13. Insulation 15, like insulation 12 and 13, is in putty-like or plastic state when applied to the coil, serving to fill the space resulting from spillage or any slight shrinkage of the mass of thermoplastic polymeric material and solventless varnish during polymerization of the latter to solid state. Insulation 15 also serves to seal the coil against the entry of moisture, dirt, etc.

In certain cases, depending upon the particular type of coil and where it is to be used, any or all of insulations 12, 13 and 15 may comprise the same mixture of materials as insulation 14. Generally, however, in such cases the proportions of finely divided, thermoplastic polymeric material and polymerizable, thermosetting solventless varnish are such as to yield a plastic or putty-like mass, in which form it is applied to the part to be sealed or insulated.

Fig. 2 represents a step in the manufacture of the coil shown in Fig. 1. More particularly this figure shows the coil on a vibrating pan 16. The coil is vibrated on this pan in order to fill the space between the outer wall 6 and the coil windings 17 with a maximum amount of finely divided, thermoplastic polymeric material 18, specifically polymerized methyl methacrylate. This finely divided material is introduced into the aforementioned space through the opening 19. The insulation 12 and 13 shown in Fig. 2 advantageously is in hardened state prior to vibrating the coil to compact the finely divided polymeric material. Hardening of this insulation (sealing compound) may be effected, for example, by heating the coil after the insulation is in place; or, if the insulation used hardens at normal temperature, then the coil may be allowed to remain at room temperature until the plastic insulation has solidified.

In the case of coils made without a casing or container, the coil is made liquid tight by sealing openings, e. g., around the bottom and the sides of the coil, with a suitable sealing compound or putty-like insulation, leaving an opening for tamping or vibrating into the coil structure finely divided filler, specifically powdered, thermoplastic polymeric material. Where paper or other layer insulation is used in the coil structure, the finely divided filler is compacted into the space between the layers of the layer insulation as well as in all other spaces sufficiently large for the filler to enter. A part of such a structure is shown in a cross-section elevational view in Fig. 6 in which open coil 31 with an impervious outer layer of insulation 32 of any suitable material such as paper, fabric etc. has one end sealed off with a sealing compound as at 33, leaving the other end open to permit the entry between the conductors 34 and inter layer insulation 35, if any, of finely divided thermoplastic polymeric material 36.

With most coils the opening for the entry of the filler is at the top of the coil; but with some coil designs it may be advantageous to introduce the filler through an opening located in some other portion of the coil structure such as that shown at 29 which may be closed by a plug 30.

After vibrating the finely divided, thermoplastic polymeric material into the unfilled portions of the coil, this material is treated to cause partial cohesion of the particles thereof and to form a permeable mass. This may be done, for example, by heating the thermoplastic polymeric material at a temperature and for a period sufficient to cause incipient fusion of the particles and to provide a non-flowing, porous body. For instance, when the polymeric material is polymerized methyl methacrylate the desired results are obtained by placing the coil in an oven 20, a portion of which is shown by way of illustration in Fig. 3, and heating the entire assembly, including the finely divided polymeric material, therein for about 5 to 10 minutes at a temperature of approximately 110° to 120°. Of course it will be understood by those skilled in the art that other temperatures and other periods of heating may be required with different thermoplastic polymeric materials.

Partial fusion of the thermoplastic polymeric material 18 to yield a porous mass makes it possible readily to handle the coil in subsequent operations without loss of filler. The lightly fused particles are not displaced by the flow of varnish during impregnation of the coil. This is of considerable importance in producing a coil substantially free from voids and from excessive shrinkage with resultant cracks that otherwise may result during curing of the varnish in the absence of the filler.

Heating of the coil to cause partial fusion of the polymeric material also results in further hardening of the insulation 12 and 13 if this insulation has not already attained its maximum hardness.

Instead of heating or otherwise treating the entire mass of finely divided, polymeric material to provide a cohesive but porous whole, we may heat or otherwise treat only the particles in the region adjacent that at which the impregnating varnish enters the coil structure in such a manner as to yield a relatively rigid, permeable mass. This modification of the invention is shown in Fig. 5. The porous mass 21 is adjacent to the finely divided, polymeric material 18 where it serves to hold the latter in place during the varnish impregnation of the coil. Instead of forming the porous mass 21 of lightly fused particles of thermoplastic polymeric material, specifically polymerized methyl methacrylate, it may be formed of a plastic or putty-like permeable mass. For instance, it may be formed of a mixture of finely divided, polymerized methyl methacrylate, polystyrene or other comminuted, thermoplastic polymeric material and a hardenable binder therefor, for instance, a polymerizable, thermosetting, solventless varnish, numerous examples of which have been given hereinbefore.

The leads 3, the inner wall of spool 2, and any threaded sections such as may be formed by machining the inner side wall 7 are suitably treated, for instance with a silicone oil or grease, to prevent the subsequently applied treating varnish from adhering tenaciously thereto.

The coil, or in usual practice, a plurality of the coils are now placed in a suitable tank or chamber 22 (Fig. 4), which may serve both as a vacuum chamber for evacuating air, etc., from the coils and as a receptacle for impregnating them with solventless varnish. A vacuum is applied to the tank by means of a vacuum pump (not shown), which is connected to the tank through a pipe 23 provided with a valve 24. After maintaining the tank under a suitably low pressure, e. g., a pressure of 300 to 500 microns, for a suitable period, e. g., from 1 to 2 hours, thereby evacuating air and other volatile impurities from the coils, the valve 24 is closed and the solventless varnish is admitted to the tank from a source of supply (not shown) through the pipe 25 provided with the valve 26. After the varnish has filled the tank at least to a point where the coils are completely immersed therein, the valve 26 is closed.

In order to facilitate the impregnation, the bath of varnish advantageously is maintained under substantial pressure, more particularly about 75 to 125 or more pounds per square inch, usually approximately 100 pounds per square inch, and under an atmosphere of a gas which itself is non-explosive and will not form an explosive mixture with any vapors evolved from the varnish, preferably a gas to which the varnish is inert, e. g., nitrogen, for a suitable period, e. g., about 1 hour. The nitrogen or other suitable gas is admitted to the tank through a line provided with a valve, neither of which is shown. At the end of the treating operation, valve 27 in line 28 is opened to permit the unused varnish to flow to storage, the coils are removed from the tank, and the excess varnish either wiped off or allowed to drain off.

The coils are next placed in an oven, which may be the oven 20, a portion of which is shown by way of illustration in Fig. 3, wherein they are heated to polymerize the solventless varnish. The temperature to which the coils are heated for curing the varnish may vary considerably, depending, for instance, upon the particular solventless varnish employed, the size and type of coils being treated and other influencing factors, but generally will be within the range of about 60° to 130° C. The time of heating is inversely proportional to the temperature and may be, for example, from approximately 8 to 72 hours. When the solventless varnish is a 50–50 mixture of diethylene glycol maleate and diallyl phthalate containing about 1 per cent by weight (of the said mixture) of benzoyl peroxide, a suitable heating period is 24 hours at 60° C. and an additional 24 hours at 100° C.

If necessary, insulation 16 (Fig. 1) is now applied in putty-like or plastic state to fill any space resulting from spillage or any slight shrinkage of the mass of thermoplastic polymeric material and solventless varnish during polymerization of the latter under heat. Depending upon its composition, this plastic mass or sealing compound is hardened by allowing the coil to remain at room temperature for a suitable period or by again placing the coil in a heated oven until the sealing compound has been converted into a hard, solid mass.

In addition to the polymerizable, thermosetting, solventless varnishes hereinbefore mentioned by way of illustration as being suitable for use in carrying the present invention into effect, other varnishes of this class may be employed, examples of which are given in copending application Serial No. 509,366 of Nordlander et al., filed November 8, 1943, and in the applications referred to therein, in D'Alelio copending applications Serial Nos. 302,167, 302,168 and 302,174, filed October 31, 1939, now Patent Nos. 2,407,479, granted September 10, 1946; 2,428,787, granted October 14, 1947, and 2,428,788, granted October 14, 1947, respectively, in Agens et al. copending application Serial No. 472,988, filed January 20, 1943, now Patent No. 2,404,204, granted July 16, 1946, and in D'Alelio Patents 2,260,005, 2,288,315, 2,308,494, 2,308,495, 2,319,798, 2,319,799 and 2,323,706. Additional examples of catalysts that may be used to accelerate the polymerization of the polymerizable solventless varnish also are given in these applications and patents.

Other examples of thermoplastic material that may be used in granular, flake, powdered or other finely divided form in practicing our invention are nylon, polyvinyl acetate, polyvinyl carbazole, polymerized methyl, ethyl and other lower alkyl acrylates, methacrylates, ethacrylates, etc., fusible polymers of the diallyl and triallyl esters, e. g., fusible polymers of diallyl phthalate, diallyl sebacate, triallyl aconitate, triallyl tricarboxylate, etc. We prefer to use a thermoplastic polymeric material which is either substantially insoluble in the solventless varnish or at least is not readily soluble therein. Thermoplastic polymeric materials which are soluble in the solventless varnish during impregnation are suitable if the rate of dissolving is not such as to increase materially the viscosity of the liquid and thus prevent satisfactory impregnation of the coil.

The insulated coils of this invention may be used in motors, generators, transformers and other electrical devices. They are adapted for use as magnet coils, transmitter loading coils, contactor coils, relay coils, solenoid coils, meter coils, field coils and the like.

What we claim as new and desire to secure by Letters Patent of the United States is:

1. An article of manufacture comprising an electrical coil insulated with solid insulation comprising particles of a thermoplastic polymeric material intimately associated with a substantially insoluble and infusible product of polymerization of ingredients including a polymerizable unsaturated alkyd resin and a liquid monomer containing an ethylenic linkage that is copolymerizable with said alkyd resin.

2. An electrical device including an electrical coil comprising windings of an insulated electrical conductor, said windings being at least partly covered with solid insulation comprising particles of thermoplastic polymeric material intimately associated with a substantially insoluble and infusible product of polymerization of ingredients including a polymerizable unsaturated alkyd resin and a liquid monomer containing an ethylenic linkage that is copolymerizable with said alkyd resin.

3. An electrical coil comprising a core, windings of an insulated electrical conductor on said core and solid insulation in contact with said windings, said insulation comprising a permeable mass of thermoplastic polymeric material in particle form impregnated with a substantially insoluble and infusible product of polymerization of ingredients including a polymerizable unsaturated alkyd resin and a liquid monomer containing an ethylenic linkage that is copolymerizable with said alkyd resin.

4. An electrical coil comprising a core, an insulated electrical conductor wound on said core, a casing surrounding said core and insulated conductor, and solid insulation substantially free from voids within said casing and protectively covering said insulated conductor, said insulation comprising a permeable mass of partly cohering particles of a thermoplastic polymer which in monomeric form contains an ethylenic linkage, and said permeable mass being intimately associated with a thermoset composition comprising the product of polymerization of an unsaturated alkyd resin and a liquid monomer containing an ethylenic linkage that is copolymerizable with said alkyd resin.

5. An electrical coil comprising a core, an insulated electrical conductor wound on said core, a casing surrounding said core and insulated conductor, and a mechanically strong body of resin of high dielectric strength within said casing and protectively covering said insulated conductor, said resin comprising a permeable mass of partly fused granules of a thermoplastic polymer which in monomeric form contains an ethylenic linkage, the voids of said permeable mass being filled with the substantially insoluble and infusible product of polymerization of ingredients including a polymerizable unsaturated alkyd resin and a compatible polyallyl ester which is copolymerizable with said alkyd resin.

6. An electrical coil the major portion of the windings of which are protectively covered with a permeable mass of particles of polymerized methyl methacrylate the voids of said mass being filled with the substantially insoluble and infusible product of polymerization of ingredients including diethylene glycol maleate and diallyl phthalate.

7. An electrical coil the major portion of the windings of which are protectively covered with a permeable mass of particles of polyvinyl acetal resin the voids of said mass being filled with the substantially insoluble and infusible product of polymerization of ingredients including diethylene glycol maleate and diallyl phthalate.

EDWARD J. FLYNN.
FRANK J. LASAK.

REFERENCES CITED

The following references are of record in the file of this patent:

UNITED STATES PATENTS

| Number | Name | Date |
|---|---|---|
| 1,455,199 | Groten | May 15, 1923 |
| 1,980,483 | Hill | Nov. 13, 1934 |
| 2,116,318 | Miles | May 3, 1938 |
| 2,136,609 | Butterfield | Nov. 15, 1938 |
| 2,191,581 | Nowak | Feb. 27, 1940 |
| 2,224,724 | Elsey | Dec. 10, 1940 |
| 2,254,072 | Jenkins | Aug. 26, 1941 |
| 2,307,588 | Jackson et al. | Jan. 5, 1943 |
| 2,347,320 | Hiltner | Apr. 25, 1944 |
| 2,400,892 | Soday | May 28, 1946 |
| 2,414,525 | Hill et al. | Jan. 21, 1947 |

FOREIGN PATENTS

| Number | Country | Date |
|---|---|---|
| 389,236 | Great Britain | Mar. 16, 1933 |